March 12, 1963   E. ZIZKA   3,080,851
END PLATE STRUCTURE FOR PNEUMATIC MOTOR
Filed Oct. 3, 1961
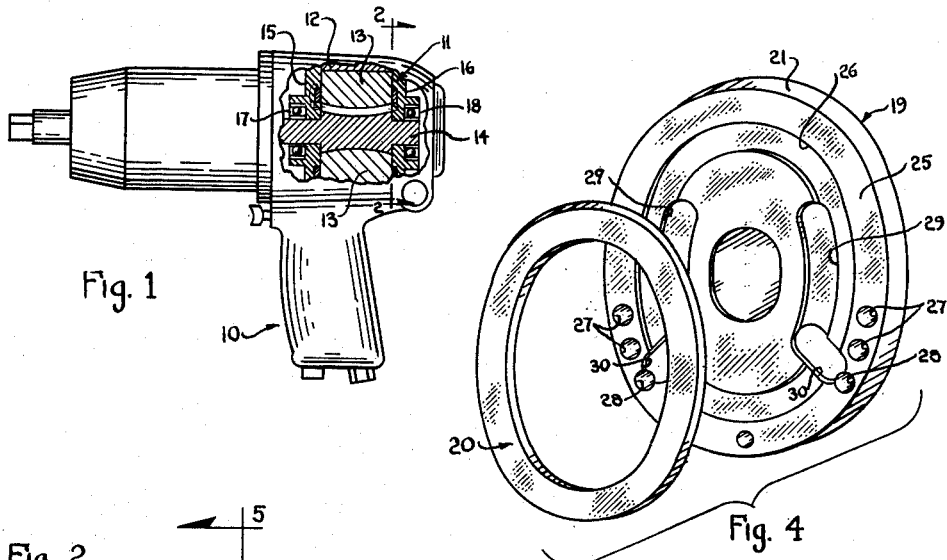
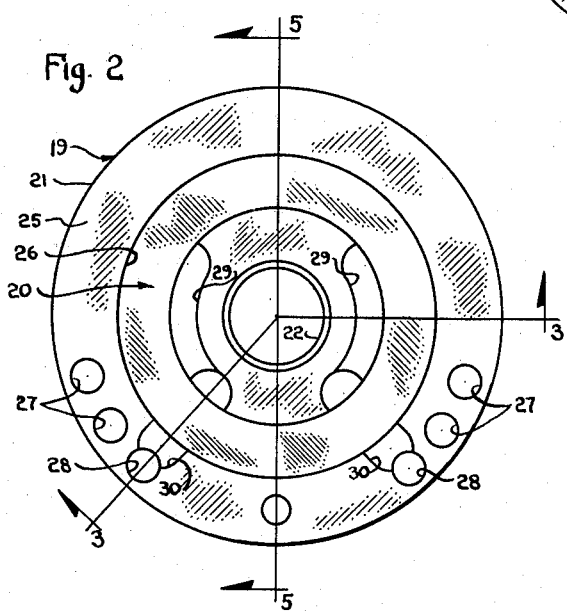
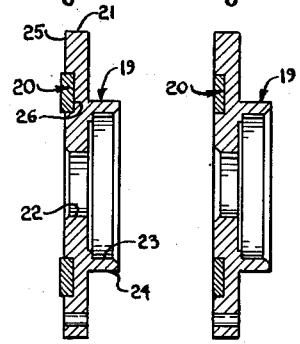
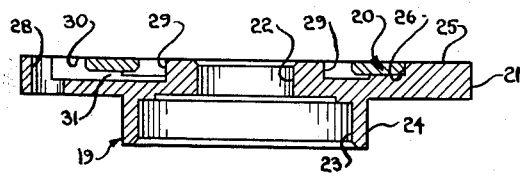
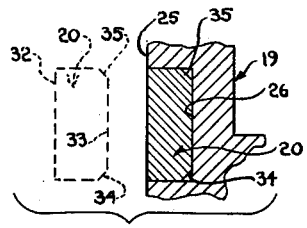
INVENTOR.
EGON ZIZKA
BY
*[signature]*
ATTORNEY

United States Patent Office 3,080,851
Patented Mar. 12, 1963

3,080,851
END PLATE STRUCTURE FOR PNEUMATIC MOTOR
Egon Zizka, Garfield Heights, Ohio, assignor to Master Power Corporation, Solon, Ohio, a corporation of Ohio
Filed Oct. 3, 1961, Ser. No. 142,585
10 Claims. (Cl. 121—34)

The present invention relates to an end plate structure for a pneumatic or hydraulic device, and more particularly, to a fabricated end plate structure that utilizes a hardened insert ring.

More specifically, in the prior art relating to pneumatic motors, a pair of disc-shaped end plates are utilized to form the conventional cylinder within which an eccentric rotor is disposed; each of the end plates is formed from a relatively-hard material, such as a high-quality steel, and requires a great deal of machining and finishing so as to form the necessary ducts and internal passageways for the transmission of the compressed air as a working medium. Experience has shown, however, that such machining and finishing is time-consuming and expensive; and accordingly, it is the general object of the present invention to alleviate this difficulty, yet provide an end plate structure having a durability and performance at least as good, if not better, than those of the prior art.

It is an object of the present invention to provide, especially for use in a pneumatic motor, a fabricated end plate structure which comprises a relatively-soft and relatively-lightweight body in combination with a hardened insert ring adhesively-bonded to the body.

It is another object of the present invention to provide a hardened insert ring that is received within an annular groove in the body and is substantially co-planar with the forward face of the body.

It is yet another object of the present invention to provide a hardened insert ring that acomplishes two purposes: one, provide a wearing surface for the end plate structure; and two, provides a cover for a portion of an externally-accessible channel formed in the forward face of the body, the combination thus forming an internal passageway in the end plate structure.

It is yet still another object of the present invention to provide a fabricated end plate structure comprising a die-cast aluminum body in combination with a steel insert ring bonded to the body by means of an epoxy type of adhesive.

These and other objects of the present invention will become apparent from an examination of the following specification, taken in conjunction with the enclosed drawings, in which:

FIGURE 1 is a side elevational view of a typical pneumatic tool, with parts broken away and sectioned to show the pneumatic motor having fabricated end plates;

FIGURE 2 is a view taken along the lines 2—2 of FIGURE 1;

FIGURE 3 is a view taken along the lines 3—3 of FIGURE 2;

FIGURE 4 is an exploded perspective view of the hardened insert ring and the die-cast body;

FIGURE 5 is a view taken along the lines 5—5 of FIGURE 2, showing the hardened insert ring adhesively-bonded to the die-cast body;

FIGURE 6 is a view, corresponding to that of FIGURE 5, but showing the hardened insert ring finished substantially coplanar or flush with the forward face of the body; and FIGURE 7 is an enlarged view of a portion of FIGURE 6, showing the annular chamfers on the undersurface of the hardened insert ring, whereby the ring may be easily fitted into the annular groove in the body.

With reference to FIGURE 1, there is illustrated a typical pneumatic tool, such as an impact wrench 10, with which the teachings of the present invention may find more particularly utility. The wrench 10 includes a pneumatic motor 11 having a cylinder 12, eccentric rotor having vanes or blades 13, a rotor shaft 14 journaled in bearings 17 and 18, and front and rear end plate structures 15 and 16, respectively. For purposes of the present invention, however, each of the end plate structures 15 and 16 may be considered to be substantially indentical to each other, although it will be appreciated that there are minor differences in size, shape, and structure between the front end plate 15 and the rear end plate 16.

With reference to FIGURES 2, 3, and 4, each of the end plates 15 or 16 comprises a relatively-soft disc-like body 19, which for convenience may be die-cast from aluminum, in combination with a hardened insert ring 20 made of steel or other suitable material. The body 19 has a circular periphery 21, a bore 22 for receiving the rotor shaft 14, a counterbore 23 formed in a rearwardly-extending portion 24 for receiving the bearing, which in this case is bearing 18, and a substantially-flat forward face 25 having an externally-accessible annular groove 26 formed concentrically therein between the periphery 21 and the more 22. Moreover, the body 19 (for the rear end plate 16) is provided with a series of four conventional openings or inlets, one of which is identified as at 27, for the purpose of directing compressed air into the cylinder 12 via ports (not shown) in a manner understood by one skilled in the art, whereby the compressed air actuates the rotor blades 13. The body 19 is further provided with a pair of through openings or holes 28, which are spaced radially inwardly of the periphery 21, and which terminate at the forward face 25 of the body 19; also, the holes 28 are circumferentially spaced from one another and are radially spaced from the bore 22 further than the annular groove 26, and the holes 28 are formed on respective axes parallel to the bore 22. It should be noted herein, of course, that in the front end plate 15, the openings or inlets 27 do not exist, while the holes 28 are blind holes and do not run completely through the front end plate structure 15. Moreover, it will be further apreciated that the openings 27 and 28 could be combined together, if desired, in the form of a common continuous opening, thus simplying the die-casting process.

With reference, again, to FIGURES 2, 3, and 4, the forward face 25 of the body 19 is provided with a pair of relatively-short kidney-shaped grooves 29, one on each side of the bore 22 and between the bore 22 and the annular groove 26, such that the annular groove 26 partially overlaps the kidney-shaped grooves 29. Furthermore, the forward face 25 of the body 19 is further provided with a pair of channels 30, and each of the channels 30 run from a respective one of the holes 28 to a respective one of the kidney-shaped grooves 29, thus communicating the holes 28 with the grooves 29. Each of the channels 30, as shown more clearly in FIGURE 3, have a depth (measured from the face 25) exceeding that of the annular groove 26, such that when the ring 20 is inserted within the annular groove 26, the ring 20 forms a cover for the portion of the channel 30 that intersects the annular groove 26; and thus a pair of internal passageways 31 (see FIGURE 3) are formed in the body 19. Consequently, when compressed air is admitted into the openings 27 and 28, a portion of the air is directed via internal passageway 31 into the kidney-shaped grooves 29, thus precluding the rotor blades 12 (and hence the rotor) from sticking (axially) against the respective inner faces of the end plates 15 or 16, and further precluding the rotor blades 13 from sticking (radially) with respect to the rotor, in a manner understood by one skilled in the art.

With reference, again, to FIGURE 3, it will be appreciated that (preferably) the kidney-shaped grooves 29 are deeper than the annular groove 26, and that the channels 30 are even deeper than the kidney-shaped grooves 29. Moreover, with reference, again, to FIGURES 2 and 4, it will be appreciated that the holes 28 may be formed, if desired, continuously with the channels 30, thus eliminating any ridges between the two, and thus further simplifying the die-casting process that may be used, if expedient.

With reference, to FIGURES 5 and 7, the insert ring 20 has a flat top surface 32 and a flat undersurface 33, the latter being provided with inner and outer annular chamfers 34 and 35, respectively, so as to allow the insert ring 20 to be easily fitted into the annular groove 26. The insert ring 20 is adhesively-bonded to the body 19 by means of a suitable bonding material, such as an adhesive epoxy-based material; and thus the insert ring 20 is rigidly disposed in the annular groove 26 of the body 19. Preferably, but not necessarily, the ring 20 has an initial thickness which is greater than the corresponding depth of the annular groove 26, as shown in FIGURES 5 and 7; and after being bonded to the body 19, as shown in FIGURE 6, the ring 19 may be finished flush or coplanar with the substantially-flat forward face 25 of the body 19. For this operation, any suitable means may be employed, such as grinding. Hence, it will be appreciated that the insert ring 20, having a hardness exceeding that of the body 19, will form the wearing surface of the end plate structure 15 against which the ends of the rotor and rotor blades 13 come into contact.

Obviously, many modifications may be made without departing from the basic spirit of the present invention; and accordingly, within the scope of the appended claims, the invention may be practiced other than has been specifically described.

I claim:

1. In a pneumatic motor, an end plate structure comprising a disc-like body having an outer circular periphery, said body having a bore formed therein and further having a substantially-flat face, said face having an annular groove formed therein between said bore and said periphery of said body, said face further having a pair of relatively-short grooves, one on each side of said bore and between said bore and said annular groove, said body further being provided with at least one pair of openings spaced radially inwardly of said periphery and terminating at said face of said body, said openings being circumferentially spaced from one another and being radially spaced from said bore further than said annular groove, said face of said body being further provided with a pair of channels, each of said channels running from a respective one of said openings to a respective one of said pair of grooves, said channels communicating said openings with said respective grooves, and said channel each having a depth measured from said face exceeding that of said annular groove, and an insert ring rigidly disposed within said annular groove and secured to said body, said insert ring being formed substantially flush with said face of said body, and said insert ring having a hardness exceeding that of said body, whereby a wearing surface is formed for said face of said body, and whereby said insert ring forms a cover for a portion of said pair of channels, thereby forming a pair of internal passageways in said body.

2. An end plate structure as described in claim 1, wherein said annular groove, said bore, and said outer circular periphery are formed concentrically with one another.

3. An end plate structure as described in claim 1, wherein said pair of relatively-shirt grooves are kidney-shaped and have a depth, measured from said face, which is greater than that of said annular groove.

4. An end plate structure as described in claim 3, wherein said channels have a depth which is slightly greater than said depth of said kidney-shaped grooves.

5. An end plate structure as described in claim 3, wherein said annular groove extends radially outwardly of said bore further than said kidney-shaped grooves, and wherein said annular groove partially overlaps said kidney-shaped grooves in the radial direction.

6. An end plate structure as described in claim 1, wherein said pair of openings comprise a pair of relatively-small through holes formed along an axis parallel to said bore.

7. An end plate structure as described in claim 1, wherein said insert ring has a substantially flat undersurface which is provided with outer and inner annular chamfers, whereby said insert ring may be easily fitted into said annular groove.

8. An end plate structure as described in claim 1, wherein said insert ring has an initial thickness which is greater than the corresponding depth of said annular groove, whereby after said insert ring is secured within said annular groove, said ring may be finished flush with the substantially flat face of said body.

9. An end plate structure as described in claim 1, wherein said body comprises a relatively-soft and relatively-lightweight cast material, and wherein said insert ring is relatively-hard and comprises the wearing surface of the structure.

10. For use in a pneumatic or hydraulic device: a structure comprising a relatively-soft and relatively-lightweight cast body having a forward face including an externally-accessible annular groove formed therein, said face further including at least one externally-accessible channel formed in said face of said body, said channel intersecting said annular groove and being deeper than said annular groove and having respective end portions extending radially inwardly and outwardly of said annular groove, in combination with a relatively-hard insert ring secured within said annular groove of said body and having an outer face which is substantially co-planar with said forward face of said body, whereby said ring provides a wearing surface for the structure, and whereby said ring provides a cover for the portion of said channel which intersects said annular groove, thereby forming an internal passageway in the structure.

References Cited in the file of this patent
UNITED STATES PATENTS

| | | |
|---|---|---|
| 611,700 | Miner | Oct. 4, 1898 |
| 619,801 | Strunk | Feb. 21, 1899 |
| 663,972 | Loeffler | Dec. 18, 1900 |
| 728,077 | Blucker | May 12, 1903 |
| 994,391 | Hauer | June 6, 1911 |
| 994,400 | Holt | June 6, 1911 |
| 2,255,781 | Kendrick | Sept. 16, 1941 |
| 2,464,997 | Shaff | Mar. 22, 1949 |
| 2,830,560 | Doeden | Apr. 15, 1958 |
| 2,980,078 | Conover | Apr. 18, 1961 |

UNITED STATES PATENT OFFICE
CERTIFICATE OF CORRECTION

Patent No. 3,080,851                                     March 12, 1963

Egon Zizka

It is hereby certified that error appears in the above numbered patent requiring correction and that the said Letters Patent should read as corrected below.

Column 1, line 37, for "acomplishes" read -- accomplishes --; column 2, line 25, for "more" read -- bore --; line 43, for "apreciated" read -- appreciated --; column 4, line 6, for "relatively-shirt" read -- relatively-short --.

Signed and sealed this 29th day of October 1963.

(SEAL)
Attest:

ERNEST W. SWIDER                              EDWIN L. REYNOLDS

Attesting Officer                            Acting Commissioner of Patents